(12) United States Patent
Allen et al.

(10) Patent No.: US 7,275,306 B2
(45) Date of Patent: Oct. 2, 2007

(54) DAMASCENE METHOD FOR FORMING WRITE COILS OF MAGNETIC HEADS

(75) Inventors: Donald Giles Allen, Morgan Hill, CA (US); Richard Jule Contreras, San Jose, CA (US); Michael Feldbaum, San Jose, CA (US); Murali Ramasubramanian, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 441 days.

(21) Appl. No.: 10/735,112

(22) Filed: Dec. 12, 2003

(65) Prior Publication Data

US 2005/0125990 A1 Jun. 16, 2005

(51) Int. Cl.
G11B 5/127 (2006.01)
H04R 31/00 (2006.01)

(52) U.S. Cl. .......................... 29/603.16; 29/603.13; 29/603.14; 29/603.15; 29/603.18; 29/606; 216/62; 216/65; 216/66; 360/122; 360/126; 360/317; 451/5; 451/41

(58) Field of Classification Search .......... 29/603.07, 29/603.13, 603.14–603.16, 603.18, 603.25, 29/606; 216/62, 65, 66; 360/122, 126, 317; 427/127, 128; 451/5, 41
See application file for complete search history.

(56) References Cited

U.S. PATENT DOCUMENTS

| 4,539,616 A | 9/1985 | Yuito et al. |
| 4,684,438 A | 8/1987 | Lazzari |
| 4,838,994 A | 6/1989 | Gulde et al. |
| 4,933,209 A | 6/1990 | Anthony et al. |
| 5,407,530 A | 4/1995 | Watanabe et al. |
| 5,665,251 A | 9/1997 | Robertson et al. |
| 6,515,826 B1 | 2/2003 | Hsiao et al. |
| 6,804,879 B2 * | 10/2004 | Hsiao et al. ............ 29/603.24 |
| 6,930,034 B2 * | 8/2005 | Colburn et al. ............ 438/619 |
| 2002/0016057 A1 | 2/2002 | Lamb, III et al. |

FOREIGN PATENT DOCUMENTS

| JP | 61156509 | 7/1986 |
| JP | 61276208 | 12/1986 |
| JP | 63-113812 | 5/1988 |
| JP | 2-230505 | 3/1989 |
| JP | 2000065617 | 3/2003 |

OTHER PUBLICATIONS

H. Yoshimizu et al., Thin Film Magnetic Film Head Composed of Inorganic Materials, IEEE Transaction on Magnetics, 28, No. 5, Sep. 1992.

* cited by examiner

*Primary Examiner*—Paul Kim
(74) *Attorney, Agent, or Firm*—John J. Oskorep, Esq.; Rambod Nader (57) ABSTRACT

An improved damascene method of forming a write coil of a magnetic head. The method includes the steps of forming a hard mask layer over an insulator layer; forming a photoresist layer over the hard mask layer; performing an image patterning process to produce a write coil pattern in the photoresist layer; etching to remove portions of the hard mask layer in accordance with the write coil pattern; etching to remove portions of the insulator layer in accordance with the write coil pattern; etching to remove the remaining portion of the etched hard mask layer; after removing the etched hard mask layer, electroplating a material within the etched portion of the insulator material; and performing a chemical-mechanical polishing (CMP) process over the electroplated material. By removing the remainder of the hard mask material before the CMP, the quality of the CMP is improved.

21 Claims, 7 Drawing Sheets

PHOTO IMAGE

FIG. 11

ETCH 1

DAMASCENE METHOD FOR FORMING WRITE COILS OF MAGNETIC HEADS

BACKGROUND OF THE INVENTION

1. Field of the Invention

This invention relates generally to damascene methods of manufacturing write coils or other suitable components of magnetic heads.

2. Description of the Related Art

Computers often include auxiliary memory storage devices having media on which data can be written and from which data can be read for later use. A direct access storage device (e.g. a disk drive) incorporating rotating magnetic disks is commonly used for storing data in magnetic form on the disk surfaces. Data is recorded on concentric, radially spaced tracks on the disk surfaces with magnetic heads. A write coil of the magnetic head is utilized to facilitate such data-writing. Read sensors in the magnetic heads are then used to read data from the tracks on the disk surfaces.

Damascene methods have been used in the manufacture of write coils of magnetic heads. One conventional damascene method involves the steps of forming a hard mask layer of $SiO_2$ over an insulator material such as hard-baked resist; forming a photoresist layer over the hard mask layer; performing an image patterning process to produce a write coil pattern in the photoresist layer; performing a first etching process (namely a plasma etch or reactive ion etch (RIE) using a gas such as $CH_4$) to remove portions of the hard mask layer in accordance with the write coil pattern; performing a second etching process (namely a plasma etch or RIE using gases such as $N_2H_2$ and $C_2H_4$) to remove portions of the hard-baked resist in accordance with the write coil pattern; depositing one or more seed layers which include tantalum (Ta) over the structure; electroplating copper (Cu) within the etched portion of the hard-baked resist; performing a first chemical-mechanical polishing (CMP) process over the structure using a first slurry to remove the top remaining Cu material; and performing a second CMP process over the structure using a second slurry to remove the top remaining hard mask material.

Some problems exist with the above-described method. For one, remaining hard mask material left over top of the structure before the CMP adversely affects the quality of the CMP, during which undesirable mask fragments are produced. Also, remaining hard mask material tends to produce an undercut which affects the step-coverage of the tantalum seed layer. Furthermore, the use of two different slurries may be required for the CMP.

Other problems relate particularly to the use of $SiO_2$ as the hard mask material when hard-baked resist is used as the insulator material. For one, the selectivity of the $SiO_2$ is relatively low ($SiO_2$ to hard-baked resist may be about 30:1) and undesirably requires the deposition of a relatively thick layer (e.g. 4000 Å of $SiO_2$). Furthermore, $SiO_2$ does not adhere well to hard-baked resist and therefore an adhesion promoter such as hexamethyldisilazane (HMDS) is needed, which is a relatively expensive step. Finally, the stress of the $SiO_2$ layer and its brittleness also become issues.

Accordingly, what are needed are improved damascene methods for forming write coils of magnetic heads.

SUMMARY

An improved damascene method of forming a write coil of a magnetic head is described herein. The method includes the acts of forming a hard mask layer over an insulator layer; forming a photoresist layer over the hard mask layer; performing an image patterning process to produce a write coil pattern in the photoresist layer; performing a first etching process to remove portions of the hard mask layer in accordance with the write coil pattern; performing a second etching process to remove portions of the insulator layer in accordance with the write coil pattern; performing a third etching process to remove the remaining portion of the etched hard mask layer; electroplating a material comprising copper (Cu) within the etched portion of the insulator layer; and performing a chemical-mechanical polishing (CMP) process over the resulting structure.

By etching the remainder of the hard mask material prior to the CMP, the CMP process is greatly improved. No remaining hard mask material is left so that previous undercut and step-coverage issues are eliminated or reduced. No undesirable mask fragments are created during the CMP. Further, the use of two different slurries is not required for the CMP. The hard mask layer may be made of any suitable hard mask material (e.g. a suitable oxide material such as $SiO_2$) and the insulator layer may be made be of any suitable electrically-insulating material (e.g. a hard-baked resist or suitable oxide material such as $SiO_2$). If a hard-baked resist is utilized as the insulator material, however, it is preferred that $Ta_2O_5$ be utilized as the hard mask material for its higher selectivity, lower brittleness, and improved adhesion compared to $SiO_2$.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION OF THE PREFERRED EMBODIMENTS

An improved damascene method of forming a write coil of a magnetic head includes the acts of forming a hard mask layer over an insulator layer; forming a photoresist layer over the hard mask layer; performing an image patterning process to produce a write coil pattern in the photoresist layer; performing a first etching process to remove portions of the hard mask layer in accordance with the write coil pattern; performing a second etching process to remove portions of the insulator layer in accordance with the write coil pattern; performing a third etching process to remove the remaining portion of the etched hard mask layer; electroplating a material comprising copper (Cu) within the etched portion of the insulator layer; and performing a chemical-mechanical polishing (CMP) process over the resulting structure. By etching the remainder of the hard mask material prior to the CMP, the CMP process is greatly improved. No remaining hard mask material is left so that previous undercut and step-coverage issues are eliminated or reduced. No undesirable mask fragments are created during the CMP. Further, the use of two different slurries is not required for the CMP. The hard mask layer may be made of any suitable hard mask material (e.g. a suitable oxide material such as $SiO_2$) and the insulator layer may be made be of any suitable electrically-insulating material (e.g. a hard-baked resist or suitable oxide material such as $SiO_2$). If a hard-baked resist is utilized as the insulator material, however, it is preferred that $Ta_2O_5$ be utilized as the hard mask material for its higher selectivity, lower brittleness, and improved adhesion compared to $SiO_2$.

The following description is the best embodiment presently contemplated for carrying out the present invention. This description is made for the purpose of illustrating the general principles of the present invention and is not meant to limit the inventive concepts claimed herein.

Figure 1:
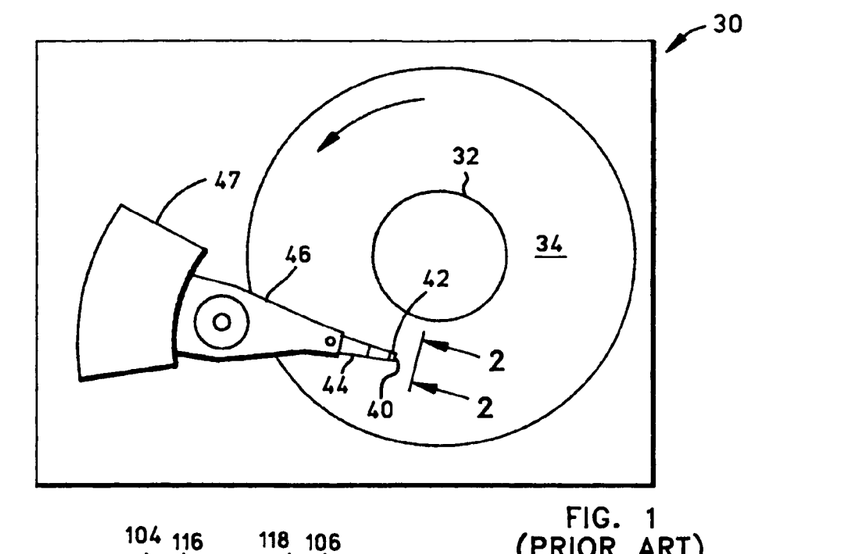
FIG. 1 is a plan view of an exemplary magnetic disk drive.
Figure 2:
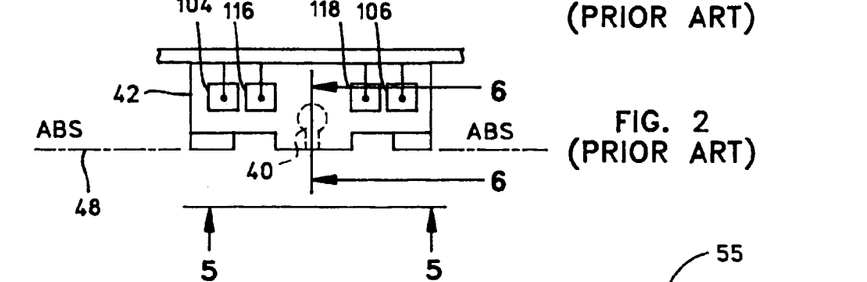
FIG. 2 is an end view of a slider with a magnetic head of the disk drive as seen in plane 2-2 of FIG. 1.
Figure 3:
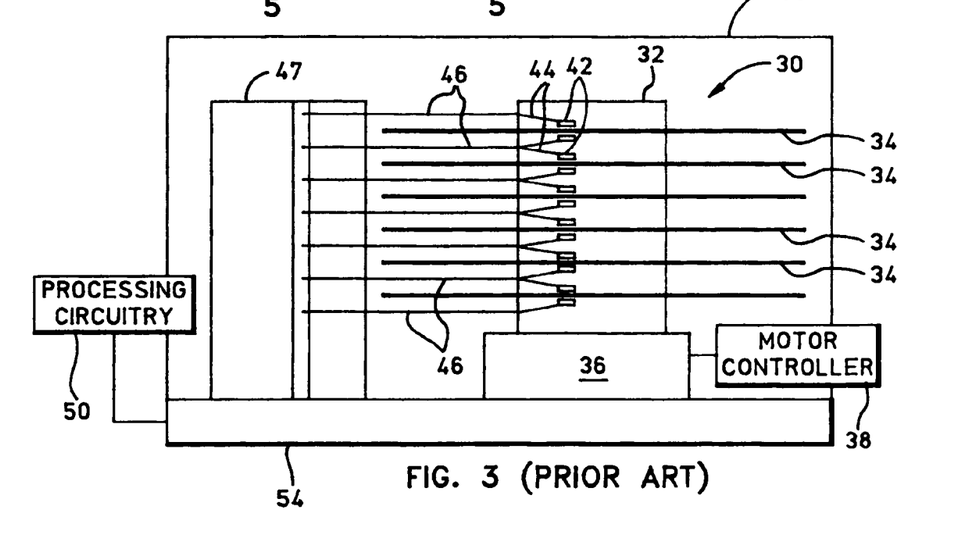
FIG. 3 is an elevation view of the magnetic disk drive wherein multiple disks and magnetic heads are employed.
Figure 4:
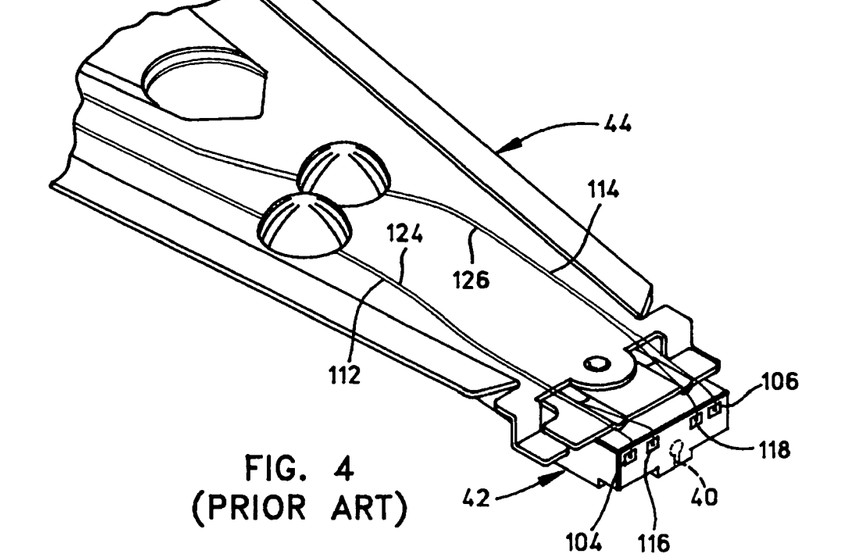
FIG. 4 is an isometric illustration of an exemplary suspension system for supporting the slider and magnetic head.
Figure 5:
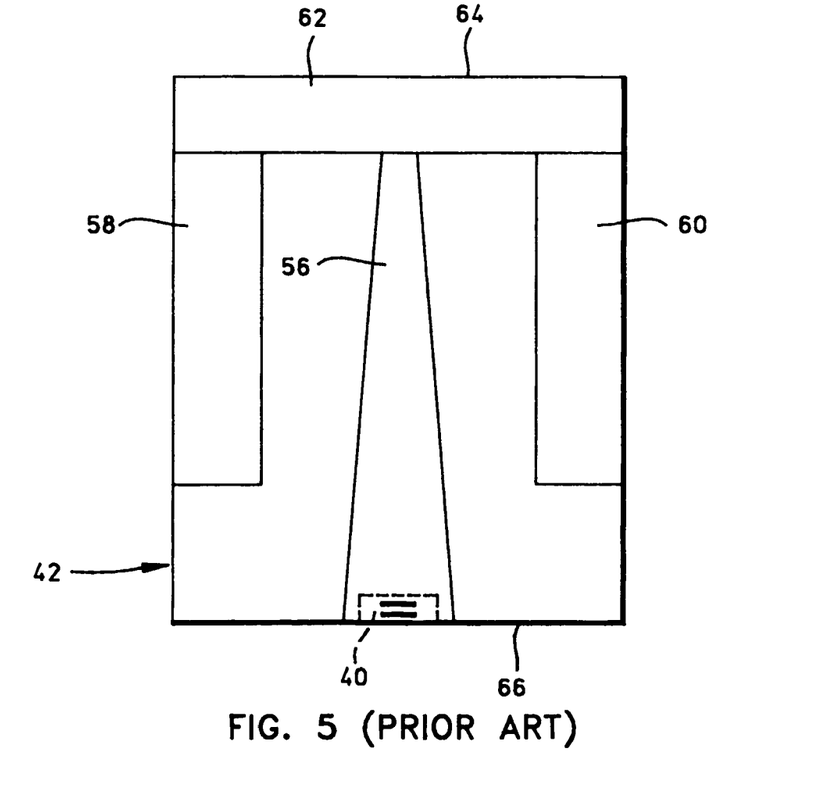
FIG. 5 is an air bearing surface (ABS) view of the magnetic head taken along plane 5-5 of FIG. 2.

Magnetic Disk Drive. Referring now to the drawings wherein like reference numerals designate like or similar parts throughout the several views, FIGS. 1-3 illustrate a magnetic disk drive 30. Disk drive 30 includes a write coil which is fabricated as described in the present application. Disk drive 30 includes a spindle 32 that supports and rotates a magnetic disk 34. Spindle 32 is rotated by a spindle motor 36 that is controlled by a motor controller 38. A slider 42 includes a combined read and write magnetic head 40 and is supported by a suspension 44 and actuator arm 46 that is rotatably positioned by an actuator 47. Magnetic head 40 may utilize the read sensor which is made in accordance with the present invention. A plurality of disks, sliders, and suspensions may be employed in a large capacity direct access storage device (DASD) as shown in FIG. 3. Suspension 44 and actuator arm 46 are moved by actuator 47 to position slider 42 so that magnetic head 40 is in a transducing relationship with a surface of magnetic disk 34. When disk 34 is rotated by spindle motor 36, slider 42 is supported on a thin (typically, 0.05 μm) cushion of air (air bearing) between the surface of disk 34 and an air bearing surface (ABS) 48. Magnetic head 40 may then be employed for writing information to multiple circular tracks on the surface of disk 34, as well as for reading information therefrom. Processing circuitry 50 exchanges signals, representing such information, with head 40, provides spindle motor drive signals for rotating magnetic disk 34, and provides control signals to actuator 47 for moving slider 42 to various tracks. In FIG. 4, slider 42 is shown mounted to a suspension 44. The components described hereinabove may be mounted on a frame 54 of a housing 55, as shown in FIG. 3. FIG. 5 is an ABS view of slider 42 and magnetic head 40. Slider 42 has a center rail 56 that supports magnetic head 40, and side rails 58 and 60. Rails 56, 58 and 60 extend from a cross rail 62. With respect to rotation of magnetic disk 34, cross rail 62 is at a leading edge 64 of slider 42 and magnetic head 40 is at a trailing edge 66 of slider 42.

Figure 6:
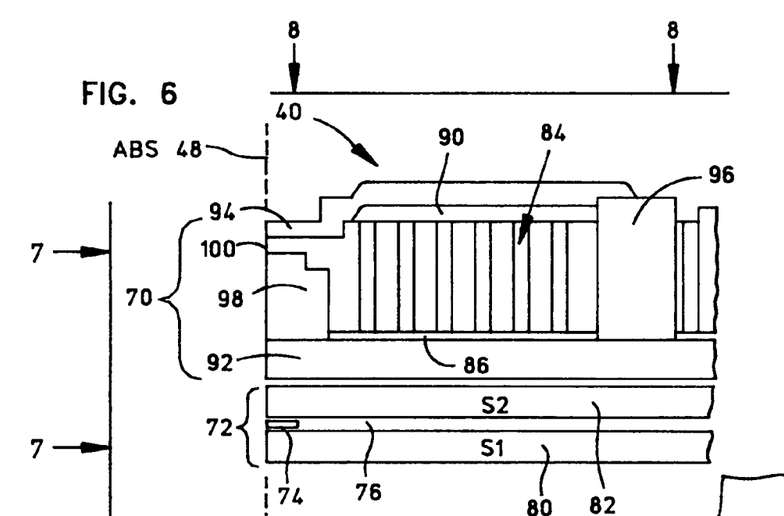
FIG. 6 is a partial view of the slider and a merged magnetic head as seen in plane 6-6 of FIG. 2.
Figure 7:
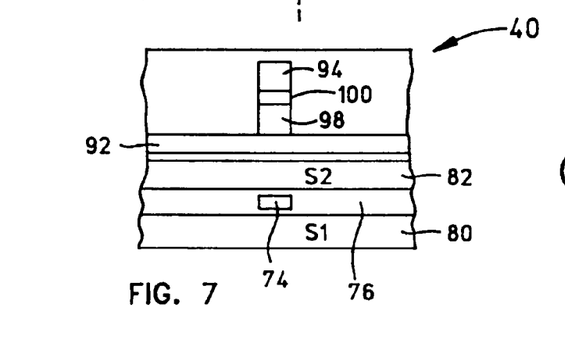
FIG. 7 is a partial ABS view of the slider taken along plane 7-7 of FIG. 6 to show the read and write elements of the merged magnetic head.

FIG. 6 is a side cross-sectional elevation view of a magnetic head 40 which includes a write head portion 70 and a read head portion 72. Read head portion 72 includes a giant magnetoresistive (GMR) read head which utilizes a spin valve sensor 74. FIG. 7 is an ABS view of FIG. 6. Spin valve sensor 74 is sandwiched between nonmagnetic electrically insulative material 76 (i.e. read gap material), which is in turn sandwiched between ferromagnetic first and second shield layers 80 and 82. In response to external magnetic fields, the resistance of spin valve sensor 74 changes. A sense current $I_s$ conducted through the sensor causes these resistance changes to be manifested as potential changes. These potential changes are then processed as readback signals by processing circuitry 50 shown in FIG. 3.

Write head portion 70 of magnetic head 40 includes a write coil 84 which is made of alternating layers of electrically conductive material (coil layers) and electrically insulating material. Preferably, the electrically conductive material in write coil 84 is or includes copper (Cu). Write coil 84 is sandwiched between first and second insulation layers 86 and 90, which are in turn sandwiched between first and second pole pieces 92 and 94 of the write head 70. First pole piece 92 may include a pole piece pedestal 98 formed at its pole tip. In a back gap region, first and second pole pieces 92 and 94 are magnetically coupled by back gap materials 96. At the ABS 48, however, first and second pole tips of the pole piece structure are separated by a write gap layer 100. As shown in FIGS. 2 and 4, first and second solder connections 104 and 106 connect leads from spin valve sensor 74 to leads 112 and 114 on suspension 44, and third and fourth solder connections 116 and 118 connect leads 120 and 122 from write coil 84 (see FIG. 8) to leads 124 and 126 on suspension 44.

Figure 8:
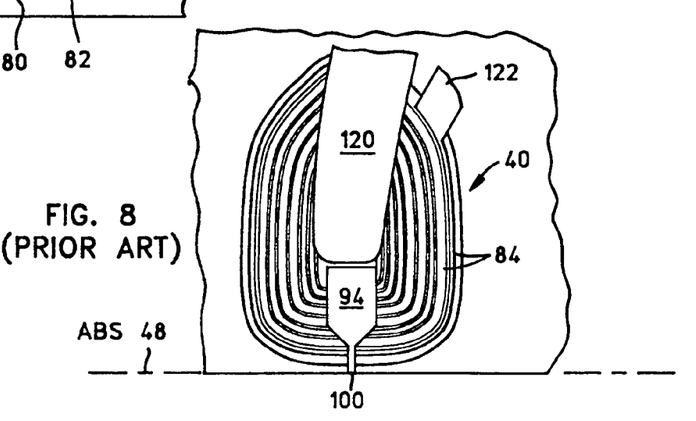
FIG. 8 is a view taken along plane 8-8 of FIG. 6 with all material above the coil layer and leads removed.
Figure 9:
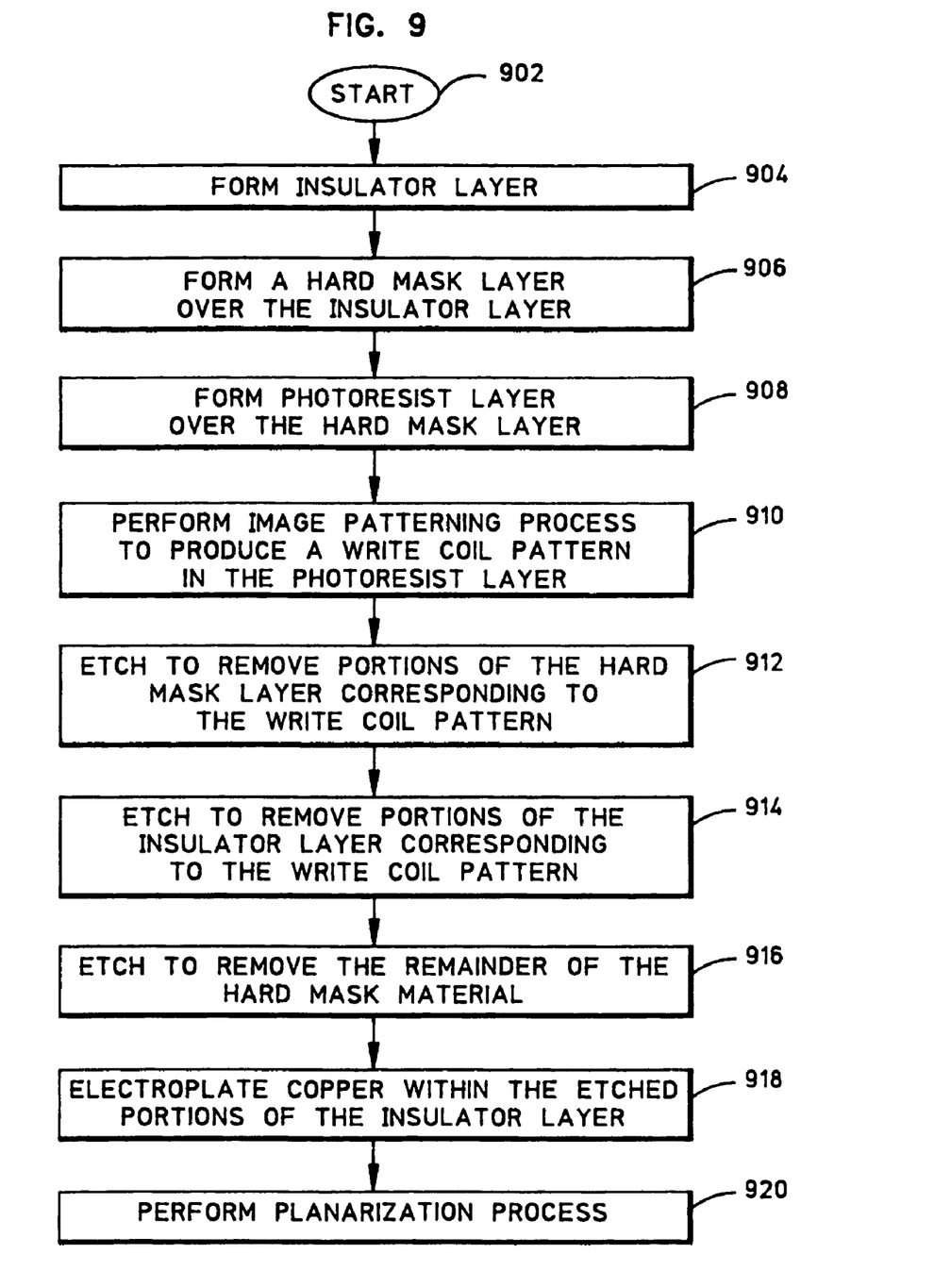
FIG. 9 is a flowchart which describes an improved damascene method of forming a write coil of a magnetic head.

FIG. 9 is a flowchart which describes an improved damascene method of forming a write coil of a magnetic head (e.g. write coil 84 of FIGS. 6 and 8 described above). FIGS. 10-17 are eight cross-sectional illustrations of partially constructed magnetic heads which correspond to the steps in the flowchart of FIG. 9. Thus, FIGS. 9 and 10-17 will be described together in combination.

Figure 10:
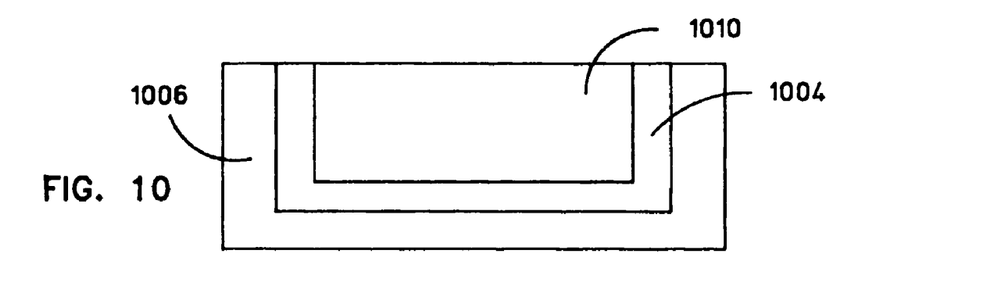
FIG. 10 is a first of eight cross-sectional illustrations of FIGS. 10-17 of partially constructed magnetic heads corresponding to the steps in the flowchart of FIG. 9, which shows an insulator layer to be etched in accordance with the method.

Beginning at a start block 902 of FIG. 9 and the partial cross-section of FIG. 10, an insulator layer 1010 is formed where a write coil is to be made (step 904 of FIG. 9). Insulator layer 1010 may be made of any suitable electrically-insulating material, such as a hard-baked resist or an oxide material such as $SiO_2$. In the present embodiment, insulator layer 1010 is a hard-baked resist which is formed by heating or baking a photoresist material. Insulator layer 1010 may have a thickness of 3.5 microns or less.

As shown in FIG. 10, insulator layer 1010 may be formed within surrounding pole piece materials 1006 which are separated from insulator layer 1010 by an additional insulator material 1004. Surrounding pole piece materials 1006 may be made of any suitable magnetic material such as nickel-iron (NiFe). Surrounding insulator materials 1004 may be made of any suitable electrically-insulating material such as alumina ($Al_2O_3$). Note that insulator layer 1010 of FIG. 10 corresponds to the location where write coil 84 of FIG. 6 is formed, and pole piece materials 1006 of FIG. 10 correspond to pole piece components 92, 96, and 98 of FIG. 6.

Figure 11:
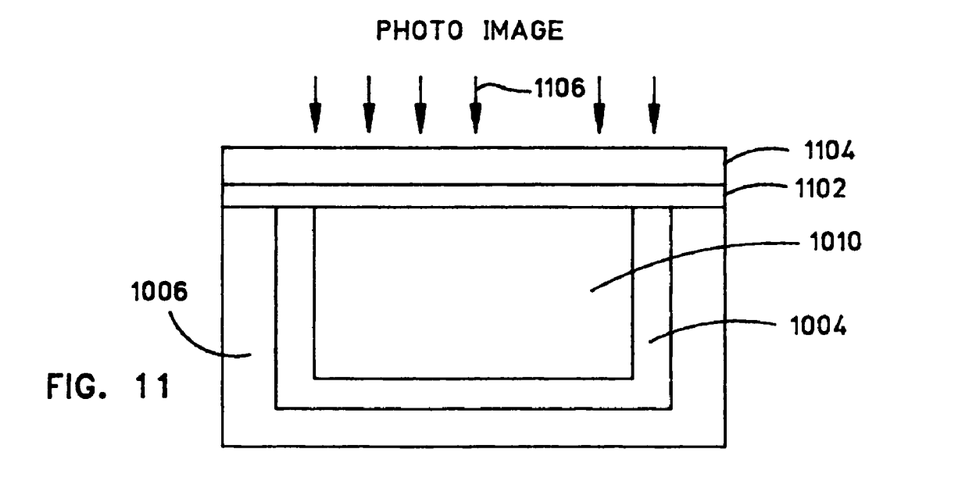
FIG. 11 is a second of the eight cross-sectional illustrations of FIGS. 10-17 which is the same as that shown and described in relation to FIG. 10, except that a hard mask layer and a photoresist layer are formed over the insulator layer and a photo imaging process is utilized to form a write coil pattern in the photoresist layer.

Next in FIG. 11, a hard mask layer 1102 is formed over insulator layer 1010 (step 906 of FIG. 9). Hard mask layer 1102 may be made of any suitable material that serves as a "stencil" for etching purposes. For example, hard mask layer 1102 may be made from an oxide material such as silicon-dioxide ($SiO_2$). The thickness of hard mask layer 1102 will depend upon the inherent selectivity of the material; it is generally desired that hard mask layer 1102 be as thin as possible. As will be described in more detail later below, if insulator layer 1010 is a hard-baked resist then it is preferred that hard mask layer 1102 be made of $Ta_2O_5$ for its higher selectivity, lower brittleness, and improved adhesion.

Next, a photoresist layer 1104 is deposited over hard mask layer 1102 (step 908 of FIG. 9). Photoresist layer 1104 may be of the polydimethylglutarimide (PMGI)-type which is formed to a thickness of between about 2000-6000 Å, with a preference towards a larger thickness. A photo image patterning process 1106 is then performed to produce a write coil pattern in photoresist layer 1104 (step 910).

Figure 12:
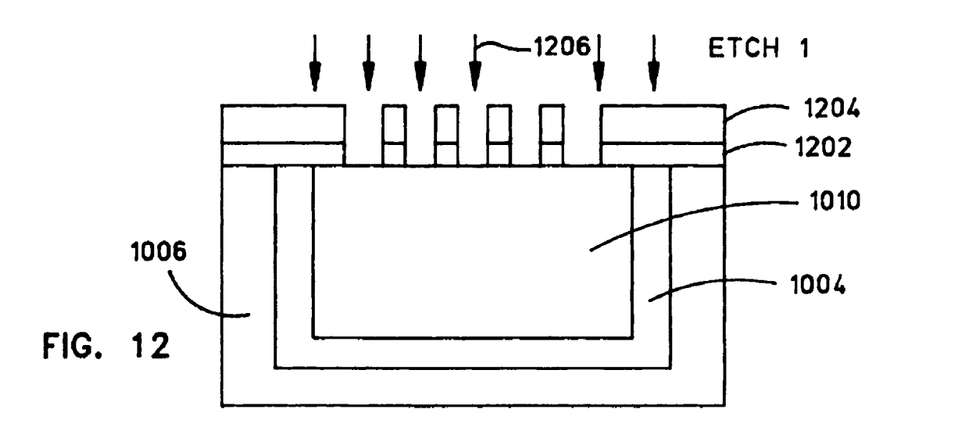
FIG. 12 is a third of the eight cross-sectional illustrations of FIGS. 10-17, which is the same as that shown and described in relation to FIG. 11 except that portions of the hard mask layer corresponding to the write coil pattern are removed by a first etching process.
Figure 13:
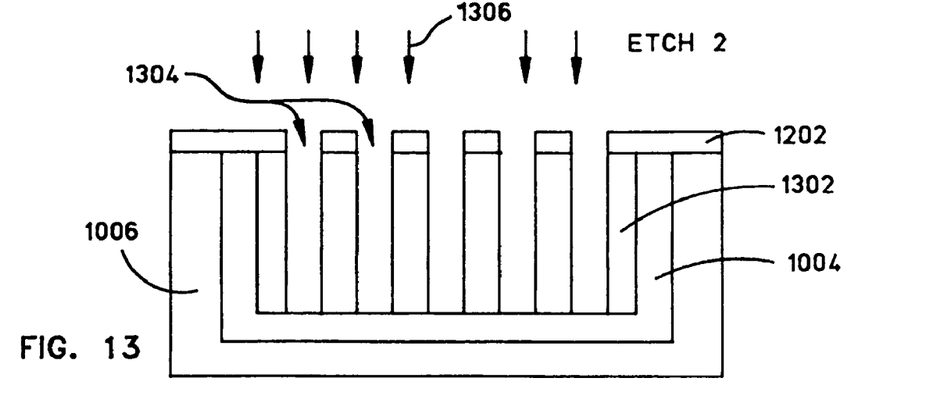
FIG. 13 is a fourth of the eight cross-sectional illustrations of FIGS. 10-17, which is the same as that shown and described in relation to FIG. 12 except that portions of the insulator layer corresponding to the write coil pattern are removed by a second etching process.

Next in FIG. 12, a first etching process 1206 is performed to remove portions of the hard mask layer corresponding to the write coil pattern (step 912). Preferably, first etching process 1206 is a plasma or reactive ion etch (RIE) using a suitable etch gas from the family of fluorine (F) gases (e.g. $CF_4$, $C_3F_8$, $C_4F_8$, or $CHF_3$). First etching process 1206 should be very directional and highly-biased. As a result, a patterned hard mask layer 1202 and a patterned photoresist layer 1204 are produced as shown in FIG. 12. Next in FIG. 13, a second etching process 1306 is performed to remove portions of the insulator layer corresponding to the write coil pattern (step 914). The second etching process 1306 of FIG. 13 is different from the first etching process 1206 of FIG. 12. Preferably, second etching process 1306 is a plasma etch or RIE using a suitable etch gas from the family of oxygen/hydrogen gases (e.g. $O_2$, $CO_2$, CO, $C_2H_2$, $CH_4$, or $N_2H_2$). Similar to first etching process 1206 of FIG. 12, second etching process 1306 should be very directional and highly-biased.

As a result, a patterned insulator material 1302 having a plurality of trenches 1304 is produced as shown in FIG. 13. Note that from the etching processes, the top photoresist layer is also completed removed; however patterned hard mask layer 1202 still remains. Trenches 1304 may be formed to between about 2-4 microns deep and between about 0.2-1.0 microns in thickness; the thickness of each surrounding insulator layer may be between about 0.2-1.0 microns.

Figure 14:
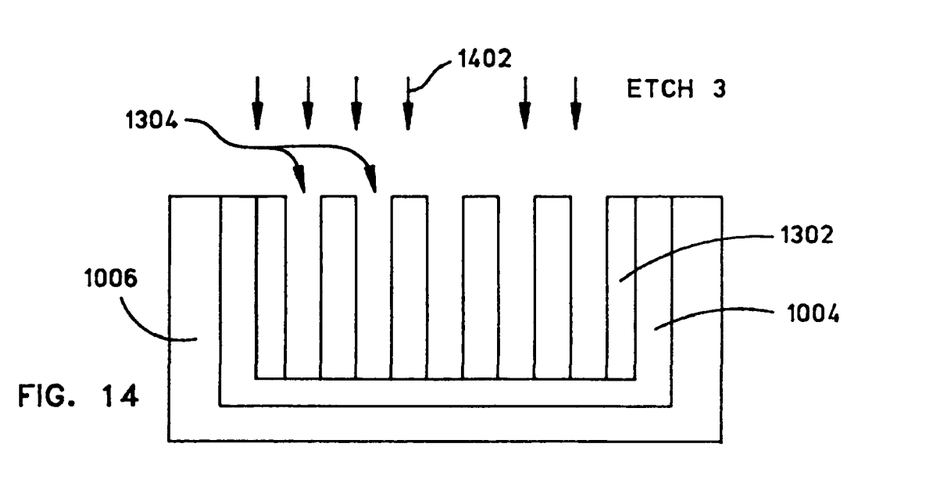
FIG. 14 is a fifth of the eight cross-sectional illustrations of FIGS. 10-17, which is the same as that shown and described in relation to FIG. 13 except that the remaining portions of the hard mask layer material are removed by a third etching process.

Next in FIG. 14, a third etching process 1402 is performed to remove the top remainder of patterned hard mask layer (layer 1202 of FIG. 13) (step 916). The third etching process 1402 of FIG. 14 is different from the second etching process 1306 of FIG. 13. Preferably, third etching process 1402 is a plasma etch or RIE using a suitable etch gas from the family of fluorine (F) gases (e.g. $CF_4$, $C_3F_8$, $C_4F_8$, or $CHF_3$). Preferably, third etching process 1402 is the same or similar etch process as first etching process 1206 of FIG. 12 (e.g. using the same exact gas such as $CF_4$). Note, however, that third etching process 1402 should be more isotropic (multi-directional) and have a low bias. This third etching process 1402 for removing such remaining material provides advantages which will be discussed later below.

Figure 15:
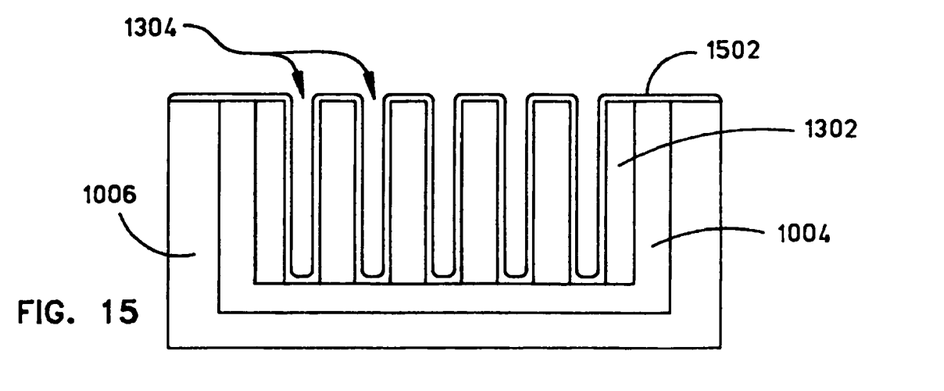
FIG. 15 is a sixth of the eight cross-sectional illustrations of FIGS. 10-17, which is the same as that shown and described in relation to FIG. 14 except that one or more seed layers are formed over the structure.
Figure 16:
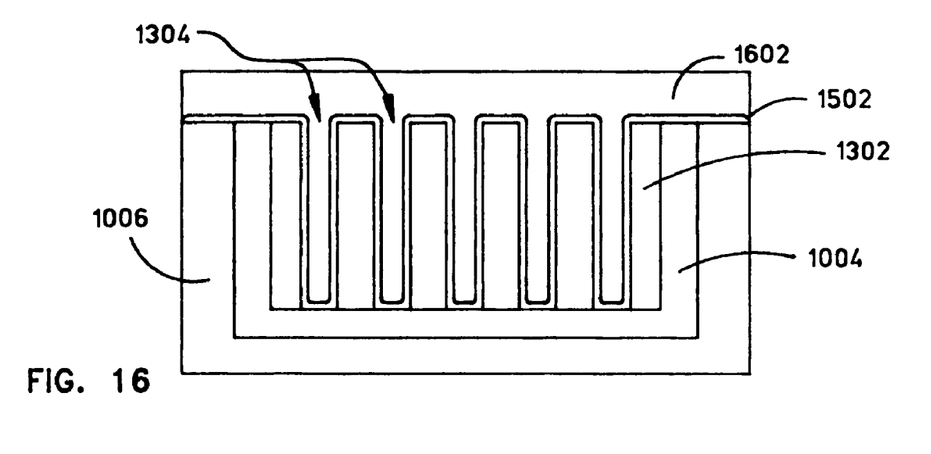
FIG. 16 is a seventh of the eight cross-sectional illustrations of FIGS. 10-17, which is the same as that shown and described in relation to FIG. 15 except that copper (Cu) is electroplated within the etched write coil pattern of the insulator material.
Figure 17:
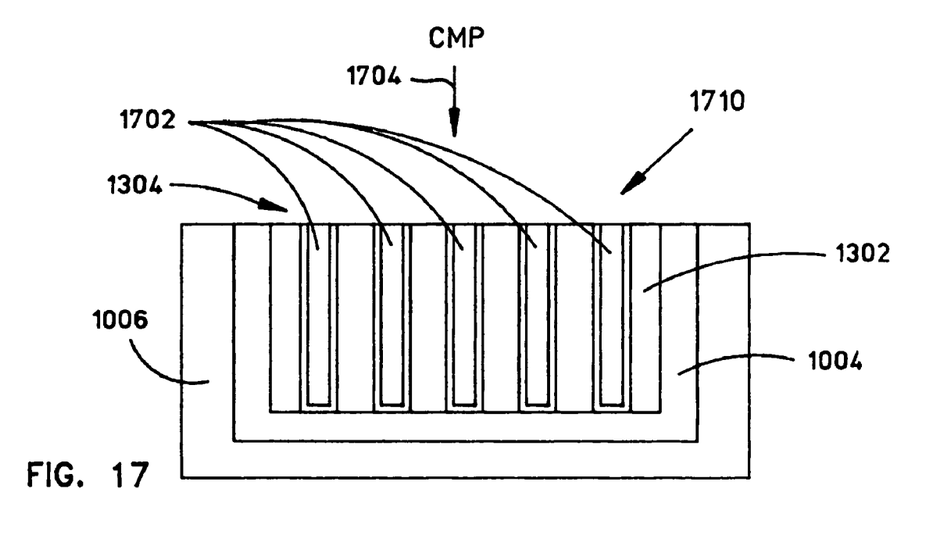
FIG. 17 is the last of the eight cross-sectional illustrations of FIGS. 10-17, which is the same as that shown and described in relation to FIG. 16 except that the surface of the structure is planarized using a chemical-mechanical polishing (CMP) process.

In FIG. 15, it is shown that a seed layer 1502 is then deposited over the resulting structure. Preferably, seed layer 1502 is a dual-layer seed layer which includes a bottom copper (Cu) layer and a top tantalum (Ta) layer. Seed layer 1502 may be formed to a thickness of between about 500-2000 Å. Next in FIG. 16, an electrically conductive material 1602 is electroplated within the plurality of trenches 1304 and well over the top of the structure (step 918). Preferably, electrically conductive material 1602 is or includes copper (Cu), but other suitable materials may be utilized. Next in FIG. 17, a surface planarization process 1704 such as a chemical-mechanical polishing (CMP) is performed to remove top portions of the electrically conductive material (step 920).

As a result, what is produced is a write coil 1710 having a plurality of write coil layers 1702 within trenches 1304. Each write coil layer 1702 is electrically isolated from its adjacent layer by insulating material. The flowchart of FIG. 9 is completed, but other remaining processes (conventional or otherwise) may be utilized to complete the manufacture of the magnetic head. Write coil 1710 of FIG. 17 corresponds to the previously described write coil 84 of FIGS. 6 and 8.

It is advantageous to remove the hard mask layer by RIE (step 916 of FIG. 9) before the CMP step. For one, it provides for run-to-run stability for the CMP since no hard mask layer is involved with the CMP; it is not necessary to change the slurry of the CMP. In addition, the result of the CMP is made independent from the thickness and the adhesion characteristics of the hard mask material. No undesirable hard mask fragments are created during the CMP. Also, the new RIE step reduces overall contamination by cleaning surrounding residues and helps improve the shape of the top portion of the trenches. The new etching step does not have a significant undesirable impact on time and convenience, as it is part of a similar etching process.

As mentioned above, if the insulator layer is a hard-baked resist, the hard mask layer is preferably $Ta_2O_5$ which has a higher selectivity, lower brittleness, and a higher adhesion compared to $SiO_2$. Advantageously, since $Ta_2O_5$ has a better selectivity than $SiO_2$, it may be formed with a reduced thickness. The selectivity of $Ta_2O_5$ to hard-baked resist is about two to three times higher than the selectivity of $SiO_2$ to hard-baked resist. If the hard mask is $SiO_2$, then a deposition thickness of about 4000 Å may be utilized; if the hard mask is $Ta_2O_5$, then a deposition thickness of about 1800 Å may be utilized. A thinner layer of hard mask translates into a reduced time for depositing mask material. $Ta_2O_5$ material is also much less brittle and adheres better than $SiO_2$—no adhesion promoter such as hexamethyldisilazane (HMDS) is necessary for the hard mask layer.

Final Comments. As described herein, an improved damascene method of forming a write coil of a magnetic head includes the acts of forming a hard mask layer over an insulator layer; forming a photoresist layer over the hard mask layer; performing an image patterning process to produce a write coil pattern in the photoresist layer; performing a first etching process to remove portions of the hard mask layer in accordance with the write coil pattern; performing a second etching process to remove portions of the insulator layer in accordance with the write coil pattern; performing a third etching process to remove the remaining portion of the etched hard mask layer; electroplating a material comprising copper (Cu) within the etched portion of the insulator layer; and performing a chemical-mechanical polishing (CMP) process over the resulting structure. By etching the remainder of the hard mask material prior to the CMP, the CMP process is greatly improved. No remaining hard mask material is left so that previous undercut and step-coverage issues are eliminated or reduced. No undesirable mask fragments are created during the CMP. Further, the use of two different slurries is not required for the CMP. The hard mask layer may be made of any suitable hard mask material (e.g. a suitable oxide material such as $SiO_2$) and the insulator layer may be made be of any suitable electrically-insulating material (e.g. a hard-baked resist or suitable oxide material such as $SiO_2$). If a hard-baked resist is utilized as the insulator material, however, it is preferred that $Ta_2O_5$ be utilized as the hard mask material for its higher selectivity, lower brittleness, and improved adhesion compared to $SiO_2$.

It is to be understood that the above is merely a description of preferred embodiments of the invention and that various changes, alterations, and variations may be made without departing from the true spirit and scope of the invention as set for in the appended claims. Few if any of the terms or phrases in the specification and claims have been given any special meaning different from their plain language meaning, and therefore the specification is not to be used to define terms in an unduly narrow sense.

What is claimed is:

1. A damascene method for use in forming a magnetic head, comprising:
   forming a hard mask layer over an insulator layer;
   forming a photoresist layer over the hard mask layer;
   performing an image patterning process with the photoresist layer for producing a patterned photoresist having a write coil pattern;
   etching to remove portions of the hard mask layer in accordance with the patterned photoresist for producing a patterned hard mask having the write coil pattern;
   etching to remove portions of the insulator layer in accordance with the patterned hard mask for producing a patterned insulator having the write coil pattern, and to remove the patterned photoresist;
   etching to remove the patterned hard mask;
   after removing the patterned hard mask, electroplating an electrically conductive material within the patterned insulator having the write coil pattern, for producing a plurality of write coil layers of a write coil of the magnetic head; and
   performing a planarization process over the electrically conductive material.

2. The damascene method of claim 1, wherein the planarization process is improved by the act of etching to remove the patterned hard mask.

3. The damascene method of claim 1, wherein the electrically conductive material comprises copper (Cu).

4. The damascene method of claim 1, wherein the hard mask layer comprises $SiO_2$.

5. The damascene method of claim 1, wherein the hard mask layer comprises $Ta_2O_5$.

6. The damascene method of claim 1, wherein the planarization process comprises a chemical-mechanical polishing (CMP).

7. The damascene method of claim 1, wherein the acts of etching to remove portions of the hard mask layer and the insulator layer comprise plasma etching.

8. The damascene method of claim 1, wherein the acts of etching to remove portions of the hard mask layer and the insulator layer comprises a reactive ion etch (RIE).

9. The damascene method of claim 1, wherein the act of etching to remove the patterned hard mask comprises a reactive ion etch (RIE).

10. The damascene method of claim 1, wherein the act of etching to remove the patterned hard mask comprises a reactive ion etch (RIE) with use of a fluorine gas.

11. The damascene method of claim 1, wherein the act of etching to remove the patterned hard mask comprises a low-bias and isotropic reactive ion etch (RIE).

12. The damascene method of claim 1, further comprising:
   wherein the act of etching to remove portions of the hard mask layer in accordance with the patterned photoresist comprises a reactive ion etch (RIE) with use of a fluorine gas; and
   wherein the act of etching to remove the patterned hard mask comprises a reactive ion etch (RIE) with use of a fluorine gas.

13. A method of forming a write coil of a magnetic head, comprising:
   forming a hard mask layer over an insulator layer, the insulator layer comprising a hard-baked resist;
   forming a photoresist layer over the hard mask layer;
   performing an image patterning process with the photoresist layer for producing a patterned photoresist having a write coil pattern;
   etching, with use of the patterned photoresist, to remove portions of the hard mask layer in accordance with the write coil pattern for producing a patterned hard mask having the write coil pattern;
   etching, with use of the patterned hard mask, to remove portions of the hard-baked resist in accordance with the write coil pattern for producing a patterned hard-baked resist having the write coil pattern;
   etching to remove the patterned hard mask;
   after removing the patterned hard mask, electroplating an electrically conductive material comprising copper (Cu) within the patterned hard-baked resist for forming a plurality of write coil layers of the write coil; and
   performing a chemical-mechanical polishing (CMP) process over the electrically conductive material.

14. The method of claim 13, wherein the CMP process is improved by the act of etching to remove the patterned hard mask.

15. The method of claim 13, wherein the hard mask layer comprises $SiO_2$.

16. The method of claim 13, wherein the hard mask layer comprises $Ta_2O_5$.

17. The method of claim 13, wherein the acts of etching to remove portions of the hard mask layer and the hard-baked resist comprise a reactive ion etch (RIE).

18. The method of claim 13, wherein the act of etching to remove the patterned hard mask comprises a reactive ion etch (RIE).

19. The method of claim 13, wherein the acts of etching to remove the patterned hard mask comprises a reactive ion etch (RIE) with use of a fluorine gas.

20. The method of claim 13, wherein the act of etching to remove the patterned hard mask comprises a low-bias and isotropic reactive ion etch (RIE).

21. The method of claim 13, further comprising:
wherein the act of etching to remove portions of the hard mask layer comprises a reactive ion etch (RIE) with use of a fluorine gas; and
wherein the act of etching to remove the patterned hard mask comprises a RIE with use of a fluorine gas.

* * * * *